United States Patent [19]

Peacock

[11] 4,299,288
[45] Nov. 10, 1981

[54] DURABLE LIGHTWEIGHT HORSESHOE AND ACCESSORIES

[76] Inventor: Robert L. Peacock, 6930 Blue Rock Rd., Cincinnati, Ohio 45247

[21] Appl. No.: 38,512

[22] Filed: May 14, 1979

[51] Int. Cl.³ .......................... A01L 1/00; A01L 7/04
[52] U.S. Cl. ...................................... 168/23; 168/24; 168/31
[58] Field of Search ..................... 168/1, 4, 11, 17, 23, 168/24, 29, 31, 41, 43, 20

[56] References Cited

U.S. PATENT DOCUMENTS

| | | | |
|---|---|---|---|
| 283,850 | 8/1883 | Billings | 168/24 |
| 473,295 | 4/1892 | Coates | 168/1 |
| 2,101,070 | 12/1937 | Kelley | 168/4 |
| 3,460,627 | 8/1969 | Teixeira | 168/24 X |
| 3,780,810 | 12/1973 | Ashton | 168/4 |
| 3,794,120 | 2/1974 | Charlson | 168/24 |

FOREIGN PATENT DOCUMENTS 2308228 10/1974 Fed. Rep. of Germany .......... 168/4

Primary Examiner—Gene Mancene
Assistant Examiner—Robert P. Swiatek
Attorney, Agent, or Firm—Kinney & Schenk

[57] ABSTRACT

A lightweight horseshoe has an open sided swedge in the ground surface thereof with a contour which accommodates wear inserts and accessories at selected positions on the shoe.

8 Claims, 10 Drawing Figures

DURABLE LIGHTWEIGHT HORSESHOE AND ACCESSORIES

BACKGROUND

The invention relates generally to farriering and specifically to horseshoes.

In the art of farriering, problems have been experienced in the past in shoeing large-footed gaming horses for instances in which the positioning of the horses' feet is critical. It is highly desirable to fit such horses in shoes that are comfortable, lightweight, and durable. In the past these multiple requirements were viewed as mutually exclusive and the advantageous aspects of one type of shoe were forsaken in order to realize the advantages of another type.

Aluminum shoes, for example, have been used to provide a lightweight horseshoe. Aluminum, however, does not have good wear qualities and aluminum shoes in the past have not been sufficiently durable for general use upon horses. Previous attempts have been made to strengthen the aluminum shoe and to improve its wear quality by casting steel inserts in the aluminum. These attempts have not been totally successful however. The steel inserts were not cast sufficiently close to the front edge of the toe and the shoes had a tendency to roll over at that location. When the shoe rolls over, the horse breaks its running action prematurely; and the shoe is not suitable for many purposes.

It is also known in the art to provide a groove or a crease in a portion of the ground side of a horseshoe. This groove, which is commonly referred to in the art as a swedge, most generally had a V-shape and was cast into the shoe. Holes were conventionally drilled in swedges and used for nails whose heads were contained in the swedge. In the prior art, the swedges function as countersinks for the nail heads.

Applicant has discovered a new and novel horseshoe which is most advantageously used upon gaming horses. The shoe eliminates many of the problems of the prior art, providing a lightweight, durable and highly flexible horseshoe for a farrier.

Accordingly, it is an object of the present invention to provide a horseshoe which is lightweight and sufficiently durable for general use upon horses.

It is another object of the present invention to provide a horseshoe with a continuous groove on the earth side of the shoe with a swedge of a novel contour.

It is a further object of the present invention to provide a swedge which is self-locking for nails of the type generally used to secure a horseshoe to the foot of a horse.

It is yet another object of the present invention to provide an aluminum horseshoe with an insert which is critically positioned with respect to the outer arcuate surface of the shoe.

It is still another object of the present invention to provide an aluminum horseshoe with a critically located steel insert.

It is still another object of the present invention to provide an aluminum horseshoe with a critically located insert formed of urethane.

It is still a further object of the present invention to provide a combination wear plate and toe clip which serves as an accessary for a horseshoe and which provides a forward mechanical extension of a horse's hoof.

These and other objects and advantages of the invention will be more readily apparent upon reading the following detailed description and upon reference to the accompanying drawings.

SUMMARY OF THE INVENTION

In accordance with the invention, a horseshoe adapted to be fitted to the hoof of a horse has a web defined by a ground surface, a hoof surface and two side walls. The web has a general U-shape configuration with a swedge in the ground surface. The swedge is defined by a substantially planar topside disposed between two side walls, each of the two side walls being substantially perpendicular to the topside at portions proximal to the topside. One of the side walls is bifurcated with the portion distal to the topside surface extending angularly away from the other surface of the bifurcated side wall proximal to the topside.

In one aspect of the invention, the horseshoe is formed of aluminum and has an insert member formed of steel or urethane disposed in the arcuate toe section of the horseshoe with the outermost surface of the steel wear member being not less than 0.1875 inch and not more than 0.3125 inch from the outer side wall of the horseshoe. The outermost surface of the steel wear member is preferably disposed between 0.230 and 0.280 inch from the outer side wall of the shoe and most preferably is disposed approximately 0.250 inch therefrom.

BRIEF DESCRIPTION OF THE DRAWINGS

In order that the invention may be more clearly understood, the following description is given, merely by way of example, with reference to the accompanying drawings, in which.

DETAILED DESCRIPTION OF THE PREFERRED EMBODIMENT

Figure 1:
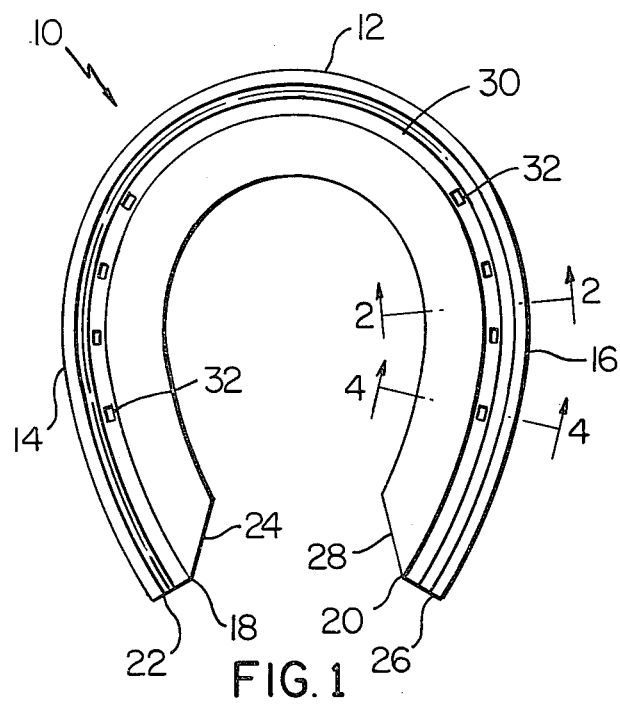
FIG. 1 is a plan view of the earth side of a horseshoe utilizing the present invention.

Referring now to the drawing and to FIG. 1 in particular, a horseshoe 10 of generally U-shape configuration is shown from the earth side. The horseshoe 10 has an arcuate toe section 12 which is disposed between two elongated side sections 14 and 16 which extend continuously from the toe section 12. The side sections 14 and 16 have small arcuate profiles but the degree of arc is much less than that of the central toe section 12. Each of the side sections 14 and 16 has one free end, 18 and 20 respectively, with the end opposite to the free end continuously merging into the arcuate toe section 12. The free end of each of the side sections is partially truncated to form bifurcated free ends, the side 14 having end sections 22 and 24 and the side 16 having end surfaces 26 and 28. The earth side of the shoe 10 illustrated is that side which comes in contact with the ground and opposite that side which interfaces with the hoof of the horse.

As seen in FIG. 1, the horseshoe 10 has a continuous crease or swedge 30 which follows the general U-shape of the shoe 10 on the earth side. Holes 32 of rectangular configuration are punched or drilled in the swedge section of the shoe. These holes are used to receive nails which will attach and secure the shoe 10 to the hoof of a horse.

Figure 2:
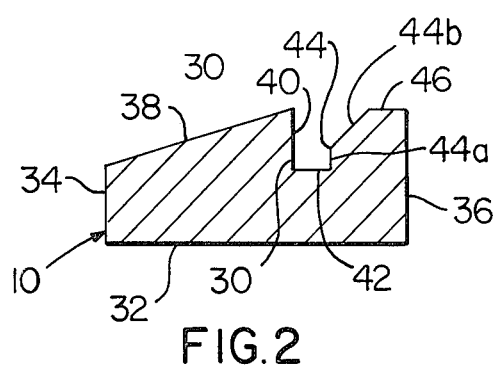
FIG. 2 is a cross sectional elevation view of the horseshoe of FIG. 1 taken along line 2—2.

Turning now to the cross sectional view of FIG. 2, it is seen that the shoe 10 has a substantially planar hoof side 32 which is on the bottom side in the orientation illustrated. It will be readily appreciated, however, by those skilled in the art that the illustrated orientation is inverted to that actually used when the shoe is secured to the hoof of a horse. In other words, as depicted in the illustrations, the top surface of the horseshoe is that which comes into contact with the ground.

Inner and outer side walls 34 and 36 extend substantially perpendicular to the hoof surface 32 at the edges thereof, the outer side wall 36 extending further than the inner wall 34. As seen in FIG. 1, both inner and outer side walls 36 have a U-shape configuration in the plane perpendicular to the depiction of FIG. 2.

Due to the disparity in height between the inner and outer side walls a portion 38 of the earth side of the hoof is obliquely oriented with respect to the side walls. This obliquely oriented surface shown as a substantially planar surface 38 functions to shed mud from the shoe 10 and to urge the shoe to the outside (in the direction of outer side wall 36) under the influence of sole pressure when the horse is running. Urging the shoe to the outside also prevents the shoe 10 from forming corns on the horse's hoof.

FIG. 2 also clearly depicts the novel contour of a swedge 30. The swedge 30 is open ended on one side and defined by two side walls 40 and 44, and a centrally disposed top (in use upon a horse) surface 42. The side wall 44 is bifurcated and includes two substantially planar surfaces obliquely oriented with respect to each other. The top surface 42, on the bottom of the swedge in the depicted orientation of the drawings, is planar and substantially parallel to the hoof surface 32. The side wall 40, on the left of the top wall surface in the depicted illustration of FIG. 2, is adjacent to and perpendicular to the top surface 42. This side wall 40 is also substantially planar and extends from the terminus of the obliquely oriented surface 38 to the top swedge wall 42. The bifurcated side wall 44 has a first substantially planar portion 44a, adjacent to and perpendicular to the top wall 42 and a second substantially planar portion 44b obliquely oriented with respect to the first. The second portion 44b of side wall 44 extends upwardly (in the orientation depicted) to a ridge section 46 which is also substantially planar and parallel to both the swedge top 42 and the hoof surface 32.

In the preferred embodiment the shoe is formed of aluminum and most preferably of aluminum 6063 alloy in the T-4 state. This type of alloy is used because it has been found superior to other alloys in terms of weight, strength, and hardness suitable for horseshoes.

Figure 3:
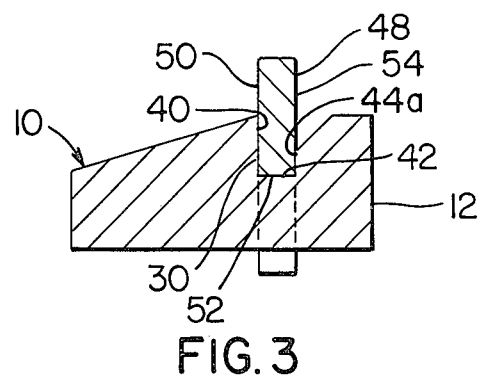
FIG. 3 is a cross sectional elevation view of the section of FIG. 2 with a toe-grab seated in the swedge.

FIG. 3 depicts a cross section of the shoe 10, through the arcuate toe section 12, with a toe insert 48 inserted in the swedge 30. The insert 48 may be formed of either steel or urethane. This insert 48 is shown extending slightly beyond the ground surface of the shoe. It will be appreciated, however, that this insert may be even with the ground surface or it may extend even further than illustrated. The toe insert 48 has a rectangular cross section. A side wall 50 of the insert 48 is substantially planar and firmly mates against side wall 40 of the swedge 30. Likewise, the bottom (as oriented in the illustration) wall 52 of the insert 48 mates with the swedge top 42, this bottom wall 52 being substantially perpendicular to the adjacent side wall 50. Side wall 54 of the insert 48 is parallel to the opposite side wall 50 and mates firmly against portion 44a of the bifurcated swedge wall 44. It has thus been seen that the perpendicular side walls of the swedge cooperate with the perpendicular side walls of the insert 48 to provide positive means to prevent relative rotation between the mating parts; and the swedge 30 is self locking.

Figure 6:
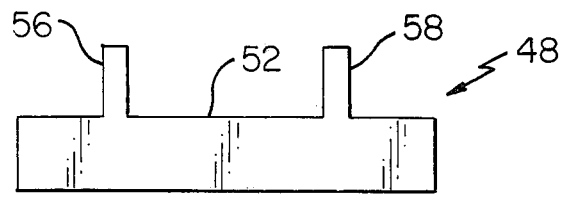
FIG. 6 is an elevational view of a toe-grab which may be inserted into the swedge of the horseshoe of FIG. 1.

Referring now to FIG. 6, it is seen from the side elevational view that the insert 48, when formed of steel, has two ears 56 and 58. Holes, corresponding to these ears are drilled or punched in the arcuate section of the swedge 30; and the holes receive the ears 56 and 58 as the insert 48 is driven into the swedge. Portions of the ears 56 and 58 which then extend through the shoe 10 are peened over and the insert becomes firmly and securely embedded in the swedge 30. It will be appreciated that the view of FIG. 6 depicts the steel insert 48 in a straightened configuration before it is arcuately formed to fit into the arcuate toe section of the swedge 30. When a urethane insert 48 is used, no ears are needed. The urethane insert is secured into the swedge by an appropriate adhesive. Generally the horseshoe 10 would be cleaned by sand blasting prior to adhesively securing the urethane insert 48 into the swedge. The insert when used in the arcuate toe section 12, may be either a wear plate or a toe grab depending upon the degree with which it extends beyond the earth surface of the shoe. A toe grab extends further and functions, as the term applies, to grab the earth as the horse takes its toe forward.

Figure 4:
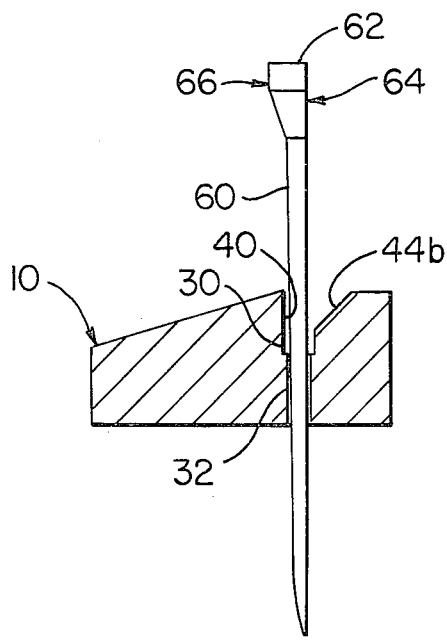
FIG. 4 is a cross sectional elevation view of the horseshoe of FIG. 1 taken along line 4—4 with a nail extending partially therethrough.

FIG. 4 depicts a cross sectional view of a nail 60 of the type generally used for securing a horseshoe to the hoof of a horse. The nails 60 are driven into the holes 32 in the swedge 30. It is seen that the head 62 of the nail 60 has one flat side 64 and one obliquely oriented side 66. Although not shown in the illustration, the obliquely oriented side 66 is knurled. In the art of farriering, the flat side always goes to the outside of the hoof.

Figure 5:
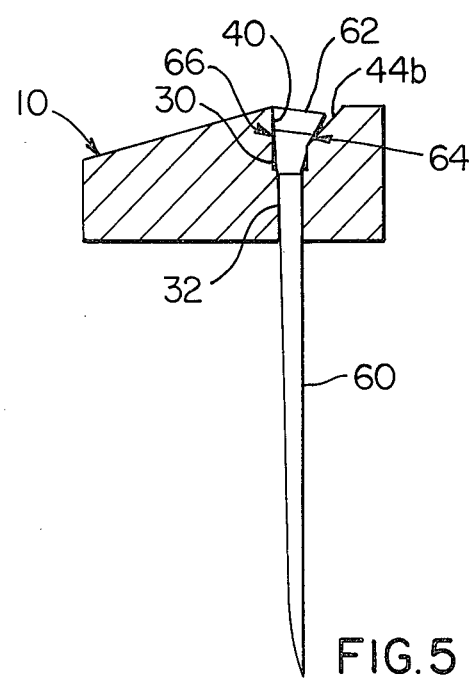
FIG. 5 is a cross sectional elevation view of the horseshoe of FIG. 1 taken along line 4—4 with a nail crimped near its head portion.

FIG. 4 illustrates that the obliquely oriented nail head side 66 is aligned with straight side wall 40 of the swedge 30. As the nail 62 is driven further into the swedge, this obliquely oriented wall strikes the straight wall 40 and is crimped over, as illustrated in FIG. 5. The obliquely oriented portion 44b of swedge wall 44 is angled away from the center of the swedge 30 and thus provides a clearance for the nail head 62 after it is crimped. When the nail 60 is crimped or bent over, it more securely fastens the shoe to the horse's hoof. Additionally, the obliquely oriented surface 44b of the swedge side wall 44 facilitates angled entry of the nail 60 into the hoof of the horse, a feature which is highly desirable.

Figure 7:
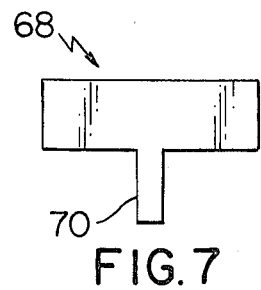
FIG. 7 is an elevational view of a heel caulk which may be used as an accessary with a swedge of FIG. 1.

FIG. 7 illustrates a steel heel caulk 68 which may be inserted into the swedge 30 proximal to the free ends of the elongated sections 14 and 16. The heel caulk 68 has one ear 70 which functions in a manner analogous to the ears 56 and 58 of the steel insert 48. It will be appreciated that the caulk 68 may be formed by shearing the steel insert 48 into two pieces, midway between the ears 56 and 58. Also, it will be appreciated that when the insert 68 is formed of urethane, no ear is needed. It is thus seen that the continuous wedge 30 permits insertion of a supplemental or corrective insert along the entire earth face of the shoe 10. This last mentioned feature provides tremendous flexibility and is particularly advantageous for applying inserts to correct a horse's walking and running motion.

Figure 8:
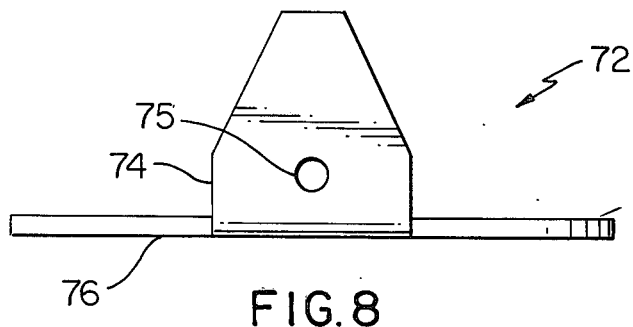
FIG. 8 is a front elevational view of a combination toe-clip and wear plate which may be used with the horseshoe of FIG. 1.
Figure 9:
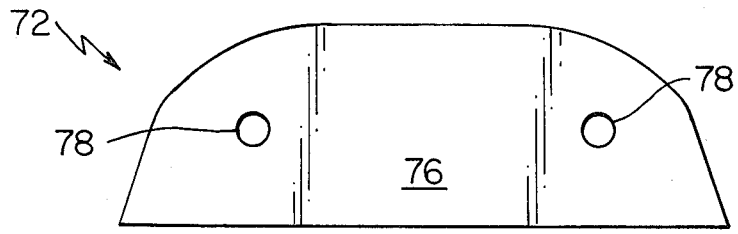
FIG. 9 is a plan view of the combination toe-clip and wear plate of FIG. 8.

A combination toe clip and forward motion plate is shown in FIGS. 8 and 9. The combination plate serves as an accessary for the horseshoe of FIG. 1 and includes a toe clip portion or section 74 extending upwardly from the shoe as it is applied on the horse's hoof. The toe clip goes around the horse's hoof and provides a positive stop for the shoe against the hoof, and keeping the shoe from sliding when pressure is applied to it from forces created by the horse's movement. The toe clip extends perpendicularly upward from a plate 76 at an arcuate terminus or extremity of the plate 76, with which it is integrally formed. The plate 76, shown in the plan view of FIG. 9, does not provide any grab. Instead, the plate functions as a support and a wear plate. The plate 76 also provides a forward mechanical extension of the horse's foot and thus effects the horse's breakover. As seen in the illustration of FIG. 9, the plate 76 has two holes 78 adapted to receive nails. The holes are positioned such that, when the toe clip is mated against the arcuate outside shoe surface 36, they coincide with the swedge 30. A single hole 75 in the clip portion 74 is perpendicular to and centrally disposed between the two holes 78 in the wear plate portion 76. This particular arrangement allows the holes for the nails to be drilled or punched in the swedge and prevents undue stresses in the remaining arcuate portions of the shoe.

Figure 10:
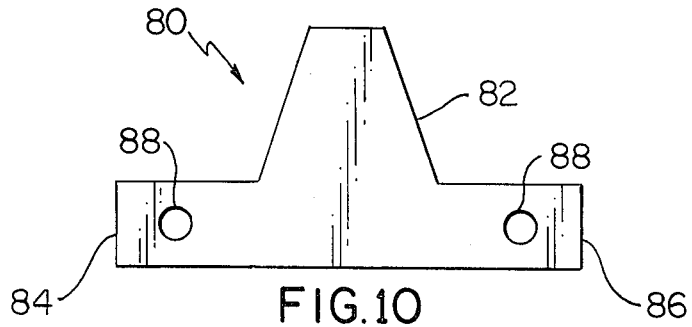
FIG. 10 is a front elevational view of a toe-clip which could also be used with the horseshoe of FIG. 1.

FIG. 10 shows a toe clip 80, preferably of steel, which may be fastened to the outside shoe wall 36 in lieu of the combination toe and wear plate 72. The toe clip 80 includes an upward extending portion 82 which functions in a manner similar to the corresponding clip section 74 of the combination assembly 72. In addition it has two wing sections 84 and 86 with holes 88 therein. The wing sections 84 and 86 mate with the shoe side wall 36 and the holes 88 receive fasteners to secure the clip 80 to the shoe 10.

Further, in accordance to another aspect of the invention, the wear member which is inserted into the arcuate toe section 12 of the preferred embodiment is very precisely located. The groove or swedge 30 assures this precise location in the preferred embodiment. Referring once again to FIG. 2, the bottom portion 44a of the bifurcated wall 44 is preferably 0.250 inch from the outer side wall 36. This location is very important particularly when wear inserts are used with aluminum shoes. If the wear insert is positioned too far from the outer shoe surface 36 it will fail to support the edge interface of the surfaces 46 and 36. Consequently, this edge wears and becomes significantly rounded. The running action of the horse will then be modified, as the horse will break his movement prematurely. On the other hand, if the insert is fitted into a swedge and is positioned too close to the outer surface 36, problems will result in nailing the shoe to the horse's hoof. If the swedge is also to be used for nailing purposes, nailing too close to the edge will fracture the horse's hoof wall.

Applicant has discovered that the steel insert should preferably be placed not less than 0.1875 inch and not more than 0.3125 inch from the outer shoe edge 36. The outermost surface of the steel wear insert is more preferably disposed between 0.230 inch and 0.280 inch from the edge 36 and most preferably this distance is approximately 0.250 inch.

The embodiment illustrated is a wide web horseshoe. It should be apparent that the same features may be used on a narrow web horse. Also, and perhaps less apparent, the preferred embodiment is advantageously made from extruded aluminum stock which is then formed to the desired shape. While the preferred embodiment facilitates delayed breaking in a horse's movement, it is also possible to reverse the arcuate shape of the shoe (with surface 34 in FIG. 2 being on the outside) and forming a rolled toe shoe which would facilitate early break in a horse's movement.

Thus it is apparent that there has been provided in accordance with the invention a horseshoe which satisfies the objects, aims, and advantages set forth above. While the invention has been described in conjunction with a specific embodiment thereof, it is evident that many alterations, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A horseshoe adapted to be fitted to the hoof of a horse, comprising:
    (a) a web defined by a ground surface, a hoof surface and two side walls, the web having a general U-shape configuration; and
    (b) an open sided swedge in the ground surface of the web, said swedge being defined by a substantially planar topside disposed between two side walls, each of the two side walls being substantially perpendicular to the topside at portions proximal thereto, one of the side walls being bifurcated with the portion distal to the topside extending angularly away from the portion of said one side wall proximal to the topside.

2. A horseshoe adapted to be fitted to the hoof of a horse, comprising:
    (a) a web formed of aluminum and defined by inner and outer sidewalls of U-shape configuration with a hoof section and a ground section extending between the sidewalls, said hoof and ground sections and said sidewalls jointly defining an arcuate toe section disposed between two elongated side sections;
    (b) a continuous open sided swedge in the web extending completely through the two elongated sections and the intermediate arcuate toe section, said swedge being defined by a substantially planar swedge surface opposite the open side disposed between inner and outer swedge walls, one of said swedge walls being substantially perpendicular to the substantially planar swedge surface and the other swedge wall having at least a portion which is non-parallel to said one swedge wall, said swedge being adapted to receive a wear member; and (c) a wear plate member disposed in the swedge extending through the arcuate toe section with its outermost surface not less than 0.1875 inch and not more than 0.3125 inch from the outer sidewall.

3. A horseshoe adapted to be fitted to the hoof of a horse, comprising:
(a) a web defined by inner and outer sidewalls of U-shape configuration with a hoof surface and a ground surface extending the sidewalls, said sidewalls and said surfaces jointly defining an arcuate toe section disposed between two elongated side sections; and
(b) an open sided swedge extending the entire length of the web in the ground surface of the web, the swedge being defined by a substantially planar swedge surface opposite the open side and disposed between inner and outer swedge walls substantially perpendicular to the substantially planar swedge surface at portions proximal thereto with one of said swedge walls having at least a portion which is non-perpendicular to the substantially planar surface, the portion of the outer swedge wall proximal to the substantially planar swedge surface being adapted to intimately mate with a sidewall of an insert for the horseshoe throughout the entire length of the web, said swedge being adapted to receive a wear member and being disposed not less than 0.1875 inch and not more than 0.3125 inch from the outer sidewall in the arcuate toe section.

4. A horseshoe as recited in claim 3 wherein the portion of the outer swedge wall proximal to the substantially planar swedge surface is disposed between 0.230 inch and 0.280 inch from the outer side wall in the arcuate toe section.

5. A horseshoe as recited in claim 3 wherein the portion of the outer swedge wall proximal to the substantially planar swedge surface is disposed approximately 0.250 inch from the outer side wall in the arcuate toe section.

6. A horseshoe adapted to be fitted to the hoof of a horse, comprising:
(a) a web defined by inner and outer side walls of U-shape configuration with a substantially planar hoof surface and a ground surface extending between the side walls, said side walls and said surfaces jointly defining an arcuate toe section disposed between two elongated side sections;
(b) an open sided swedge extending into the arcuate toe section in the hoof surface of the web, the swedge being defined by a substantially planar swedge surface opposite the open end and substantially parallel to the hoof surface, said swedge surface being disposed between inner and outer swedge walls substantially perpendicular to the swedge surface at portions proximal thereto, the outer swedge wall being bifurcated with a portion distal to the swedge surface extending angularly away from the portion of the outer swedge wall proximal to the swedge surface, (c) a substantially planar plate with an arcuate terminus fitted over the ground surface of the web proximal to the arcuate toe section, said plate having at least two holes aligned with said swedge for receiving a fastener which extends into said swedge; and
(d) a clip integral with the planar plate and extending perpendicular thereto from the arcuate plate terminus and fitting over the outer web wall, said clip having a hole disposed substantially perpendicular to and centrally between the two holes in said plate for receiving a fastener which extends into the outer web wall.

7. A horseshoe adapted to be fitted to the hoof of a horse, comprising:
(a) a web formed of aluminum and defined by inner and outer side walls of U-shape configuration with a substantially planar hoof surface and a ground surface extending between the side walls, said hoof and ground surfaces and said side walls jointly defining an arcuate toe section disposed between two elongated side sections;
(b) an open sided swedge in the ground surface of said web, said swedge being defined by a substantially planar surface substantially parallel to the hoof surface disposed between two swedge side walls, each of the two side walls being substantially perpendicular to the planar surface at portions proximal thereto, one of the swedge side walls being bifurcated with the portion distal to the planar surface extending angularly away from the portion of said bifurcated wall proximal to the planar surface;
(c) an insert formed of urethane having a generally rectangular cross sectional configuration and intimately mated to the planar surface and swedge side walls proximal thereto; and
(d) means for securing said insert into said swedge.

8. A horseshoe adapted to be fitted to the hoof of a horse, comprising:
(a) a web formed of an extruded aluminum 6063 alloy and defined by inner and outer sidewalls of U-shaped configuration with a hoof section and a ground section extending between the sidewalls, said hoof and ground sections and said sidewalls jointly defining an arcuate toe section disposed between the elongated side sections, each of said elongated side sections terminating in free ends distal to the arcuate toe section; and
(b) an open sided swedge in the hoof section, said swedge being defined by a substantially planar swedge surface opposite the open side disposed between inner and outer swedge walls, one of said swedge walls being substantially perpendicular to the substantially planar swedge surface and the other swedge wall having at least a portion which is non-parallel to said one swedge wall, said swedge extending continuously from the free end terminus of one of the elongated side sections to the free end terminus of the other elongated side section through said arcuate toe section.

* * * * *